United States Patent
Xu

(10) Patent No.: US 9,224,081 B2
(45) Date of Patent: Dec. 29, 2015

(54) IMAGE RECORDING APPARATUS

(71) Applicant: Shan Xu, Nagoya (JP)

(72) Inventor: Shan Xu, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/225,984

(22) Filed: Mar. 26, 2014

(65) Prior Publication Data

US 2014/0293317 A1    Oct. 2, 2014

(30) Foreign Application Priority Data

Mar. 29, 2013    (JP) ................... 2013-073747

(51) Int. Cl.
*G06K 15/00* (2006.01)
*G06K 15/02* (2006.01)
*H04N 1/00* (2006.01)

(52) U.S. Cl.
CPC ........ *G06K 15/4095* (2013.01); *G06K 15/1823* (2013.01); *G06K 15/4075* (2013.01); *H04N 1/00832* (2013.01)

(58) Field of Classification Search
None
See application file for complete search history.

(56) References Cited

U.S. PATENT DOCUMENTS 6,366,744 B1 *  4/2002  Phillips et al. ................. 399/24
2007/0242297 A1  10/2007  Eki
2008/0111842 A1 *  5/2008  Hall et al. ........................ 347/7
2009/0190937 A1 *  7/2009  Willis ............................. 399/27
2010/0054764 A1 *  3/2010  Nishikawa ..................... 399/27
2012/0218600 A1 *  8/2012  Shaw et al. .................. 358/1.15
2012/0300254 A1 * 11/2012  Kato ............................ 358/1.15

FOREIGN PATENT DOCUMENTS

| JP | 2007-055123 A | 3/2007 |
| JP | 2007-282027 A | 10/2007 |
| JP | 2009-255405 A | 11/2009 |

\* cited by examiner

*Primary Examiner* — John Wallace

(74) *Attorney, Agent, or Firm* — Merchant & Gould PC

(57) ABSTRACT

An image recording apparatus includes: at least one container, a recorder, a communication unit, an input device, a memory, a display, and a controller. The controller performs: receiving a recording command via the communication unit; storing the recording command in the memory; and detecting a remaining amount of the consumables in the container. And the controller further performs: calculating a consumption amount of the consumables in accordance with the stored recording command; receiving authentication information; authenticating the stored recording command and comparing the detected remaining amount of the consumables with the calculated consumption amount to be consumed for the image of the authenticated recording command; and displaying information of a first authenticated recording command with a first indication indicating the first authenticated recording command is executed, when the calculated consumption amount is equal to or less than the detected remaining amount.

9 Claims, 18 Drawing Sheets

FIG.4A  INK-CONSUMPTION-AMOUNT CONVERSION TABLE

| CYAN AVERAGE DENSITY | CONSUMPTION AMOUNT (pl) |
|---|---|
| 0 | 0 |
| 1 | 0.3 |
| 2 | 0.5 |
| ... | ... |
| 255 | 45 |

| MAGENTA AVERAGE DENSITY | CONSUMPTION AMOUNT (pl) |
|---|---|
| 0 | 0 |
| 1 | 0.2 |
| 2 | 0.3 |
| ... | ... |
| 255 | 37 |

| YELLOW AVERAGE DENSITY | CONSUMPTION AMOUNT (pl) |
|---|---|
| 0 | 0 |
| 1 | 0.4 |
| 2 | 0.5 |
| ... | ... |
| 255 | 44 |

| BLACK AVERAGE DENSITY | CONSUMPTION AMOUNT (pl) |
|---|---|
| 0 | 0 |
| 1 | 0.3 |
| 2 | 0.6 |
| ... | ... |
| 255 | 56 |

FIG.4B  SHEET-TYPE CORRECTION TABLE

| SHEET TYPE | COEFFICIENT |
|---|---|
| REGULAR PAPER | 0.6 |
| GROSS PAPER | 1 |
| POSTCARD | 0.8 |

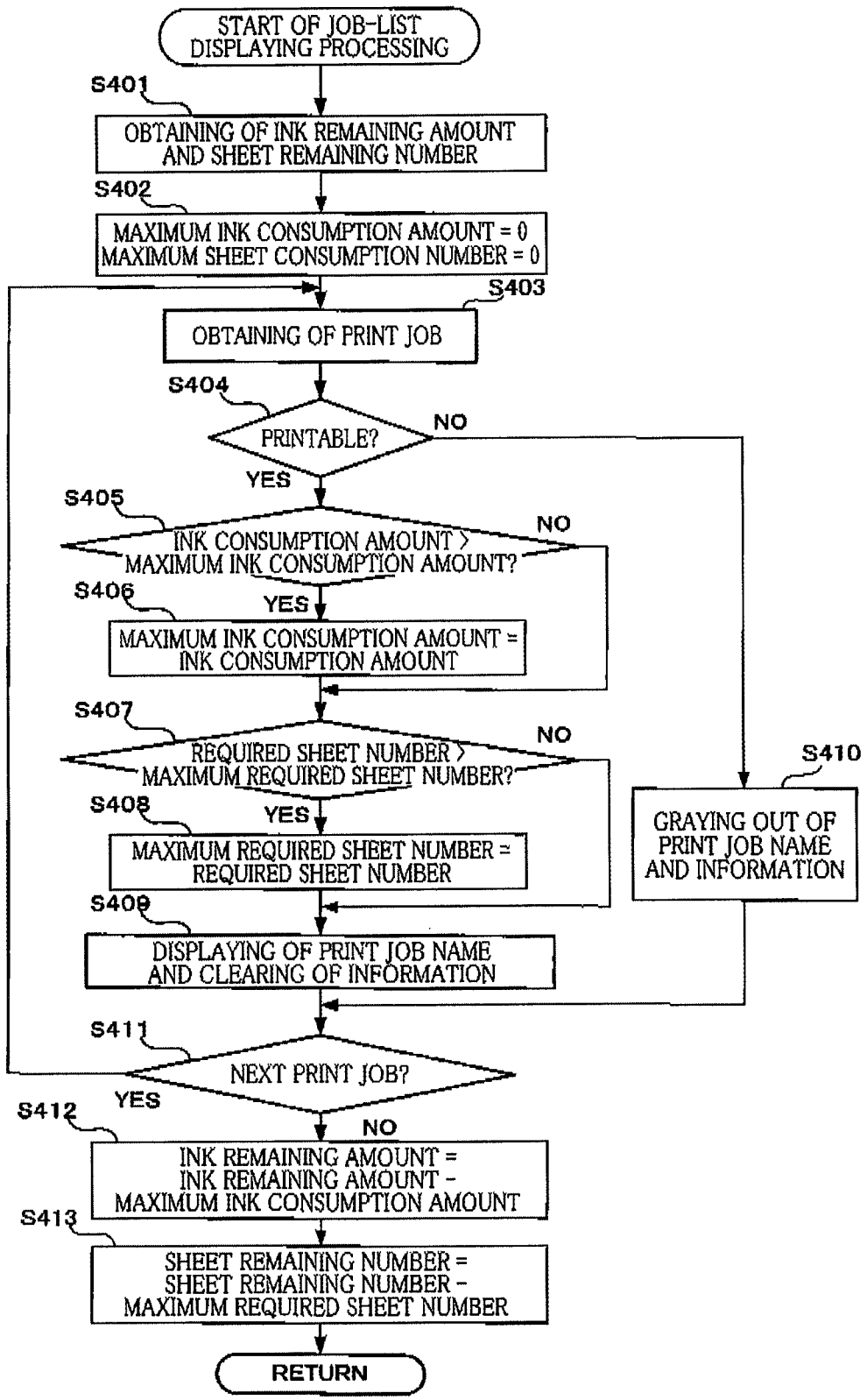

FIG.9

| SELECTION | PRINT JOB NAME | INFORMATION |
|---|---|---|
| ☑ | 001 | SHORTAGE OF SHEET SHORTAGE OF (C) INK |
| ☐ | 002 | |
| ☑ | 003 | SHORTAGE OF SHEET |
| ☐ | 004 | |

PRINT JOB LIST

SETTING CHANGE | CANCEL | PRINT

PRINT JOB LIST

| SELECTION | PRINT JOB NAME | INFORMATION |
|---|---|---|
| ☑ | 001 | SHORTAGE OF SHEET SHORTAGE OF (C) INK |
| ☑ | 002 | |
| ☑ | 003 | SHORTAGE OF SHEET |
| ☑ | 004 | |

SETTING CHANGE | CANCEL | PRINT

IMAGE RECORDING APPARATUS

CROSS REFERENCE TO RELATED APPLICATION

The present application claims priority from Japanese Patent Application No. 2013-073747, which was filed on Mar. 29, 2013, the disclosure of which is herein incorporated by reference to its entirety.

BACKGROUND OF THE INVENTION

1. Field of the Invention

The present invention relates to an image recording apparatus for recording an image on a recording medium.

2. Description of Related Art

There is known a technique in which, in order to enhance security of a printed matter, a user transmits image data of an image to be printed from a terminal to a printer, and then the user finishes an authentication procedure in front of the printer. After the authentication procedure, printing is performed based on the image data.

SUMMARY OF THE INVENTION

Even if the printing starts after the authentication procedure was completed, when it is needed to replenish either of supplies for printing such as recording sheets, ink and so forth during the printing, the user may have to be away from the printer in the middle of the printing in order to go to a place where the supplies are stored and so on. At this time, while the user is away from the printer, another user may replenish the supplies and continue the printing, so that it is possible that information leaks out.

It is therefore an object of the present invention to provide an image recording apparatus capable of preventing leakage of information in a secure environment in which authentication information needs to be input.

In order to achieve the above-mentioned object, according to the present invention, there is provided an image recording apparatus including: at least one container, each being configured to contain consumables; a recorder configured to record an image with the consumables on a recording medium; a communication unit configured to communicate with an external device; an input device configured to output information corresponding to user operation; a memory; a display configured to display information; a controller coupled with and configured to control the recorder, communication unit, input device, and the display. The controller is configured to perform: receiving a recording command, via the communication unit, transmitted from the external device; storing, in the memory, the recording command received by the communication unit, when the received recording command requires specific information to authenticate; detecting a remaining amount of the consumables in the container; calculating a consumption amount of the consumables to be consumed for recording the image in accordance with the stored recording command; receiving authentication information, from the input device, the authentication information corresponding to the stored recording command; determining whether the received authentication information includes the specific information required by the stored recording command to authenticate; when it is determined that the received authentication information includes the specific information required by the stored recording command to authenticate, authenticating the stored recording command and comparing the detected remaining amount of the consumables with the calculated consumption amount of the consumables to be consumed for recording the image in accordance with the authenticated recording command; determining the authenticated recording command as a first authenticated recording command when the calculated consumption amount of the consumables is equal to or less than the detected remaining amount of the consumables; displaying, on the display, information of the first authenticated recording command with a first indication indicating the first authenticated recording command is executable by the recorder; determining the authenticated recording command as the second authenticated recording command when the calculated consumption amount of the consumables is greater than the detected remaining amount of the consumables; and displaying, on the display, information of the second authenticated recording command without the first indication.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which:

FIGS. 4A and 4B are block diagrams each showing a content of ink consumption table shown in FIG. 2;

FIG. 8A is a flow chart showing a procedure of a job-list displaying processing shown in FIG. 7.

FIG. 9 shows a screen displayed on an operation panel in the job-list displaying processing shown in FIG. 8A;

FIG. 11 shows a screen displayed on the operation panel in the print-job selection processing shown in FIG. 10;

DETAILED DESCRIPTION OF THE PREFERRED EMBODIMENTS

Hereinafter, there will be described preferred embodiments of the invention with reference to the drawings. First, there will be described an image processing system as a first embodiment with reference to the drawings. In the first embodiment, the present invention is applied to a Multi Function Peripheral (hereinafter, referred to as "MFP") having a printer function.

First Embodiment

Figure 1:
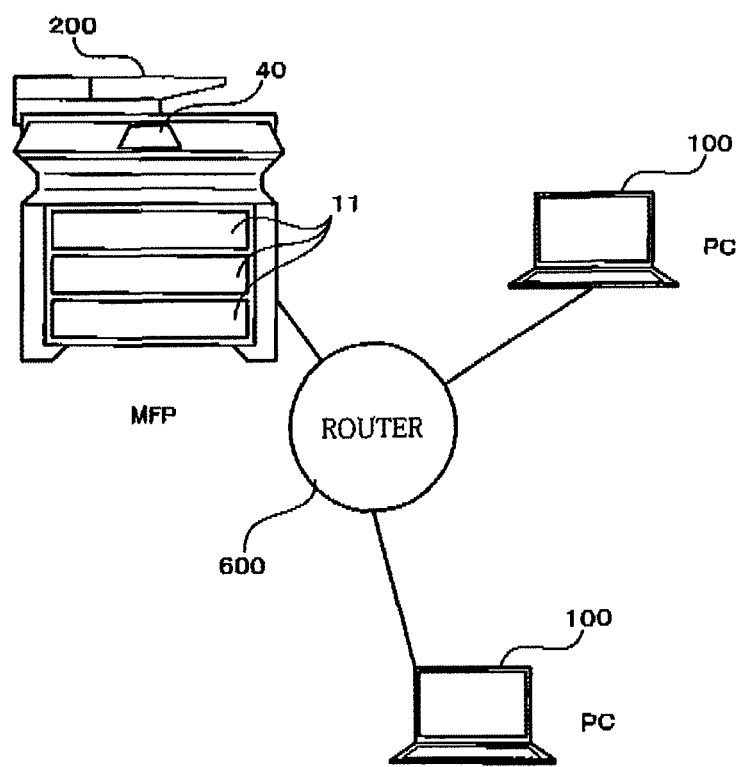
FIG. 1 is a schematic view showing a structure of an image processing system as a first embodiment to which the present invention is applied.

As shown in FIG. 1, one or a plurality of personal computers (PC) 100 each of which outputs print jobs to the designated MFP 200 and the MFP 200 (an example of image recording apparatus) having the printer function are connected to a router of intracompany network (LAN; Local Area Network).

The MFP 200 may be capable of a color printing or a monochrome printing only. In the present embodiment, the MFP 200 is capable of a color printing. Further, as a printer's type, the MFP 200 may adopt an electrophotographic type or an inkjet type.

Figure 2:
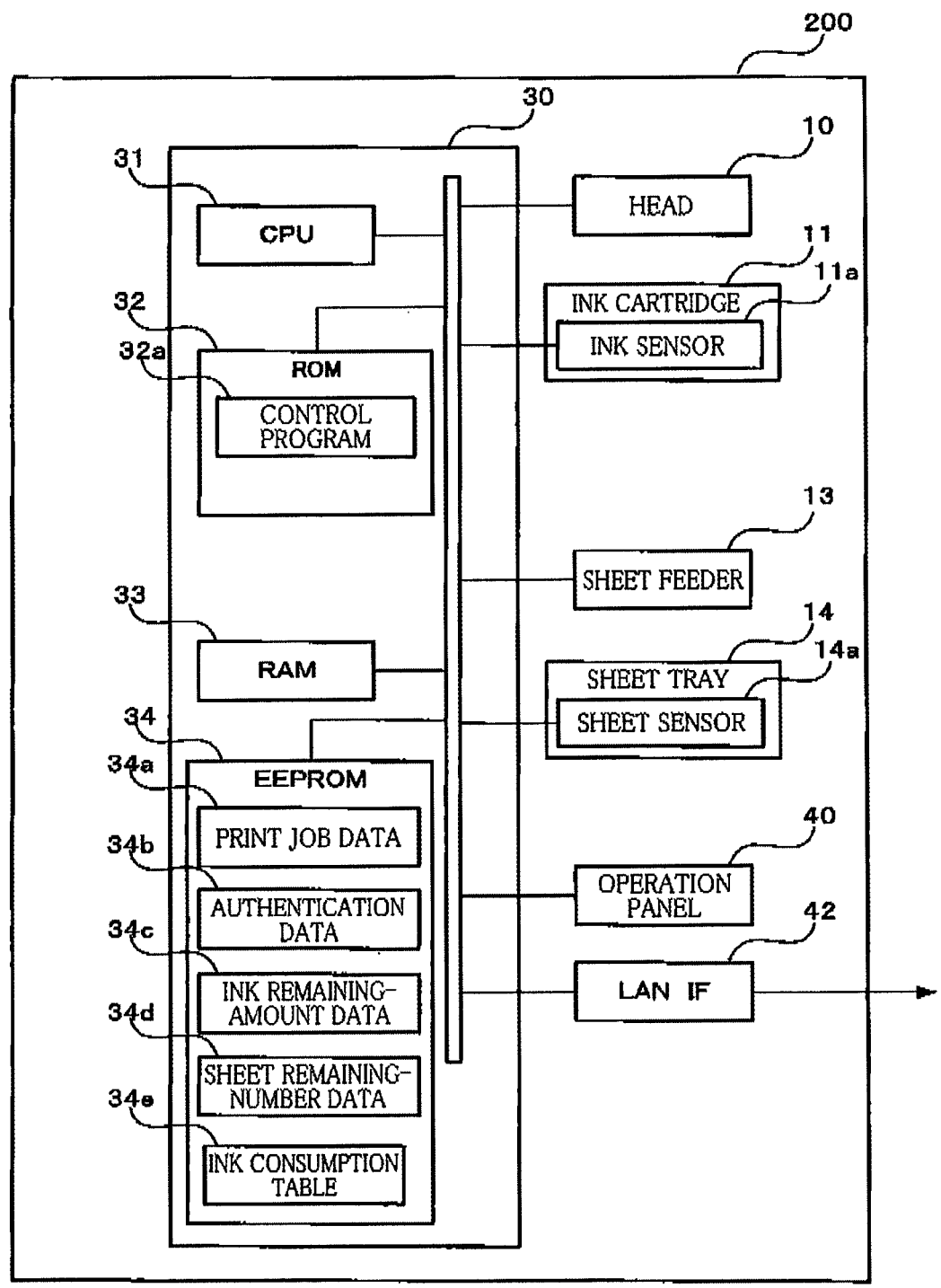
FIG. 2 is a functional block diagram showing a Multi Function Peripheral (MFP) shown in FIG. 1.

Hereinafter, a schematic structure of the MFP will be described. As shown in FIG. 2, the MFP 200 comprises an inkjet head (an example of a recorder) 10 which records an image on a sheet, a plurality of ink cartridges (an example of at least one container) 11 each of which holds ink (an example of consumables) supplied to the head 10, an operation panel (an example of an input device and a display) 40 which displays performing conditions and receives input operations by a user, a sheet feeder 13 which feeds a sheet such that an image is printed on the sheet by the head 10, a sheet tray (an example of at least one container) 14 which holds a plurality of sheets (an example of consumables; an example of a recording medium) to be fed by the sheet feeder 13, a LAN interface 42, and a controller 30 which is electrically connected to the head 10, the plurality of ink cartridges 11, the operation panel 40, the sheet feeder 13, the sheet tray 14 and the LAN interface 42.

The head 10 ejects ink droplets of four colors such as cyan (C), yellow (Y), magenta (M) and black (Bk). Each color of ink is held by corresponding one of the ink cartridges 11 different from each other. Each ink cartridge 11 is detachably attached to the MFP 200. As printing is performed such that the ink droplets are ejected from the head 10, a remaining amount of ink in each ink cartridges 11 decreases. Each ink cartridge 11 has an ink sensor 11a that senses the remaining amount of ink and outputs a signal regarding the remaining amount of ink. The ink sensor 11a is a reflective sensor (reflection-type sensor) that senses a height of liquid level of ink and is held inside of the ink cartridge 11. The ink sensor 11a may be other types of sensors capable of sensing the remaining amount of ink. A result sensed by the ink sensor 11a is outputted to the controller 30. The controller 30 detects the remaining amount of ink based on the output signal from the ink sensor 11a.

As printing is performed, a remaining number of the sheets held by the sheet tray 14 decreases. The sheet tray 14 has a sheet sensor 14a that senses the remaining number of the sheets. The sheet sensor 14a is a reflective sensor that senses a height of the sheets stacked on the sheet tray 14 and outputs a signal regarding the height of the sheets on the sheet tray 14. The sheet sensor 14a may be other types of sensors capable of sensing the remaining number of the sheets. A result sensed by the sheet sensor 14a is outputted to the controller 30. The controller 30 detects the remaining number of the sheets based on the output signal from the sheet sensor 14a.

The controller 30 includes a CPU (Central Processing Unit) 31, a ROM (Read Only Memory) 32, a RAM (Random Access Memory) 33, and an EEPROM (Electrically Erasable Programmable Read-Only Memory) 34. In the ROM 32, there are stored a print program 32a (a firmware, described in detail later) that is a control program for controlling the MFP 20, various kinds of settings, initial values, and so on. The RAM 33 is used as a working area in which the various kinds of control programs are read out, or a storage area for temporarily storing data.

The EEPROM 34 is a rewritable and non-transitory memory and stores print job data 34a including print jobs (an example of recording commands) transmitted from the PC 100, authentication data 34b (an example of authentication information), ink remaining-amount data 34c that indicates the remaining amount of ink in each ink cartridge 11, sheet remaining-number data 34d that indicates the remaining number of the sheets in the sheet tray 14, and ink consumption table 34e.

The CPU 31, according to the control program that is read from the ROM 32 and signals transmitted from the various sensors, stores processing results in the RAM 33 and controls various composing elements of the MFP 200.

The LAN interface 42 can be connected to a router 600 through wire communication. The MFP 200 is allowed to transmit or receive data to or from various devices including the PC 100 connected to the router 600 through the LAN interface 42. The operation panel 40 is a touch panel including an input device constituted by various buttons that receive the user's input and a screen which displays messages and setting contents.

The print program 32a is executed such that the CPU 31 can perform a normal printing and a storage printing. When the CPU 31 received the print job as the normal printing, the CPU 31 unconditionally starts printing according to the received print job. When the CPU 31 received the print job as the storage printing, the CPU 31 stores the received print job, and then starts printing after the CPU 31 confirmed that the user, who had transmitted the print job, inputted a printing instruction through the operation panel 40. Since the storage printing is performed, it is restrained that printing results are exposed to others and leakage of information can be prevented.

Figure 3:
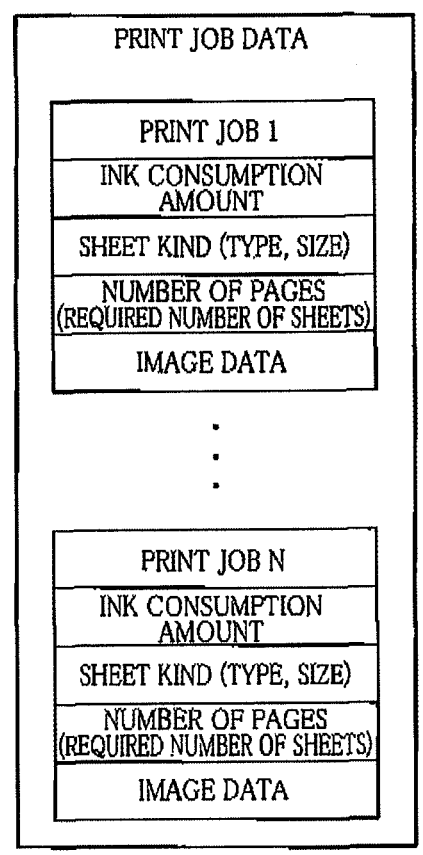
FIG. 3 is a block diagram showing a content of print job data shown in FIG. 2.

The print job as the storage printing is stored in the EEPROM 34 as the print job data 34a. As shown in FIG. 3, the print job data 34a includes one or a plurality of print jobs (an example of one or a recording command, shown as a print job 1 through a print job N in FIG. 3) each is stored by each of the users previously registered. Each print job includes an ink consumption amount (an example of a consumption amount), a sheet kind including a sheet type (a regular paper, a gloss paper, or a postcard) and a sheet size, a number of pages (a required number of sheets) that is a number of sheets for printing, and image data. The image data stored in the print job data 34a is raster data. An actual ink consumption amount (an example of a consumption amount) is calculated after the print job was received (described later). Further, the sheet kind and the number of pages may be changed after the print job was received.

The authentication data 34b is allocated to the users respectively, and in the storage printing, the authentication data 34b is compared with authentication data inputted by the user through the operation panel 40. When the authentication data inputted by the user coincides with the authentication data 34b stored in the EEPROM 34, the CPU 31 judges that the authentication data inputted by the user is equipped with predetermined (specific) information.

The ink remaining-amount data 34c indicates the remaining amount of ink in each ink cartridge 11 detected by the CPU 31 based on the output signal from each ink sensor 11a. The sheet remaining-number data 34d indicates the remaining number of the sheets detected by the CPU 31 based on the output signal from the sheet sensor 14a.

The ink consumption table 34e is used when the ink consumption amount is calculated corresponding to each print job of the print job data 34a. As shown in FIGS. 4A and 4B, the ink consumption table 34e includes ink-consumption-amount conversion tables (FIG. 4A) and a sheet-type correction table (FIG. 4B). In the ink-consumption-amount conversion tables for respective colors of cyan, yellow, magenta and black, an average density indicated in 256 gradation (0-255) and the ink consumption amount (pl) are related to each other. The average density is an average density per one pixel in the image data. As described later, the CPU 31 calculates the average density corresponding to each color of ink from the image data (in 256 gradation) of the print job, and calculates the ink consumption amount per one pixel by multiplying the average density by the consumption amount related to the average density. Furthermore, the CPU 31 calculates (predicts) the ink consumption amount by multiplying the ink consumption amount per pixel by a total number of pixels (multiplying of a number of pixels of the image data and a number of pages).

In the sheet-type correction table, a coefficient is related to each of the sheet types (a regular paper, a gloss paper, and a postcard). The CPU 31 corrects the ink consumption amount by multiplying the ink consumption amount previously calculated by the coefficient according to the type of the sheet to be recorded. The corrected ink consumption amount is stored in the print jobs in the EEPROM 34.

Figure 5:
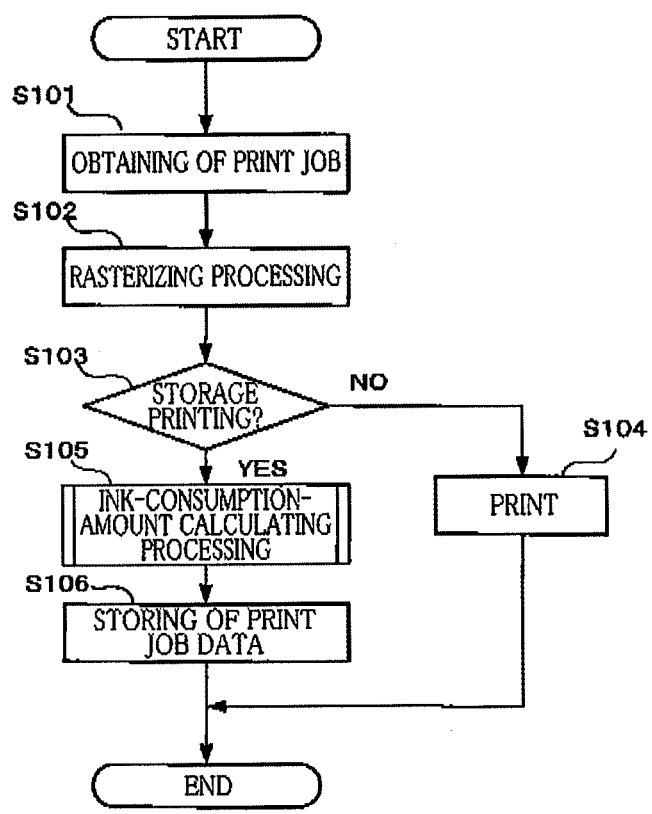
FIG. 5 is a flow chart showing a procedure regarding printing executed by the MFP.

Hereinafter, operation of the print program 32a will be described with reference to FIGS. 5 and 6. The print program 32a starts when the MFP 200 receives the print job transmitted from the PC 100. As shown in FIG. 5, the CPU 31 obtains the received print job (step S101; hereinafter, "step" will be omitted) and rasterizes the image data (vector data) of the obtained print job so as to convert the image data into the raster data (S102). The CPU 31 judges whether the received print job is the storage printing (S103). When the CPU 31 judges that the received print job is not the storage printing (S103: NO), it means that the normal printing should be performed, so that the CPU 31 executes the normal printing according to the print job (S104), and ends executing of the flow chart of FIG. 5.

When the CPU 31 judges that the received print job is the storage printing (S103: YES), the CPU 31 executes the ink consumption-amount calculating processing (S105), then stores the calculated ink consumption amount as the print job data 34a in the EEROM 34 (S106), and ends executing of the flow chart of FIG. 5.

Figure 6:
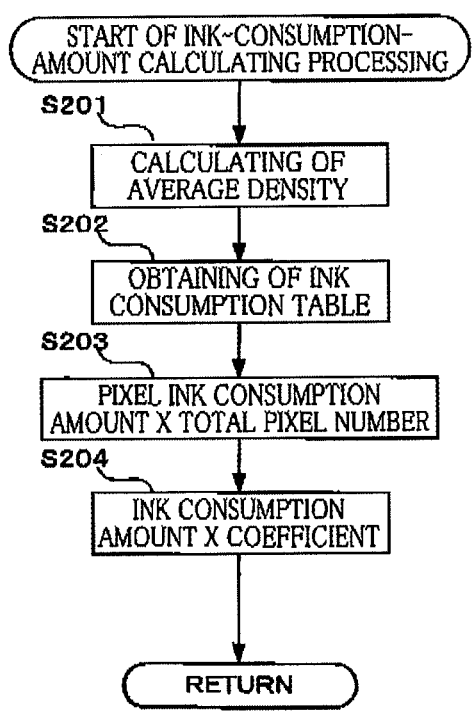
FIG. 6 is a flow chart showing a procedure of an ink consumption-amount calculating processing shown in FIG. 5.

As shown in FIG. 6, when the ink consumption-amount calculating processing starts, the CPU 31 calculates the average density of each color of ink from the image data (in 256 gradation) of the print job (S201), and obtains the ink consumption table 34e (S202). The CPU 31, with reference to the ink-consumption-amount conversion tables in the obtained ink consumption table 34e, calculates the ink consumption amount for each color of ink per one pixel by multiplying the calculated average density by the consumption amount related to the average density. Further, the CPU 31, with reference to the sheet size and the number of pages included in the print job, calculates the ink consumption amount by multiplying the ink consumption amount per one pixel by the total number of pixels (multiplying of the number of pixels of the image data and the number of pages) (S203). The CPU 31, with reference to the sheet-type correction table in the obtained ink consumption table 34e, corrects the ink consumption amount by multiplying the previously calculated ink consumption amount by the coefficient related to the sheet type (S204). The corrected ink consumption amount is stored in the print jobs in the EEPROM 34. Then, the CPU 31 ends executing of the flow chart of FIG. 6 and returns to executing of the flow chart of FIG. 5.

Figure 7:
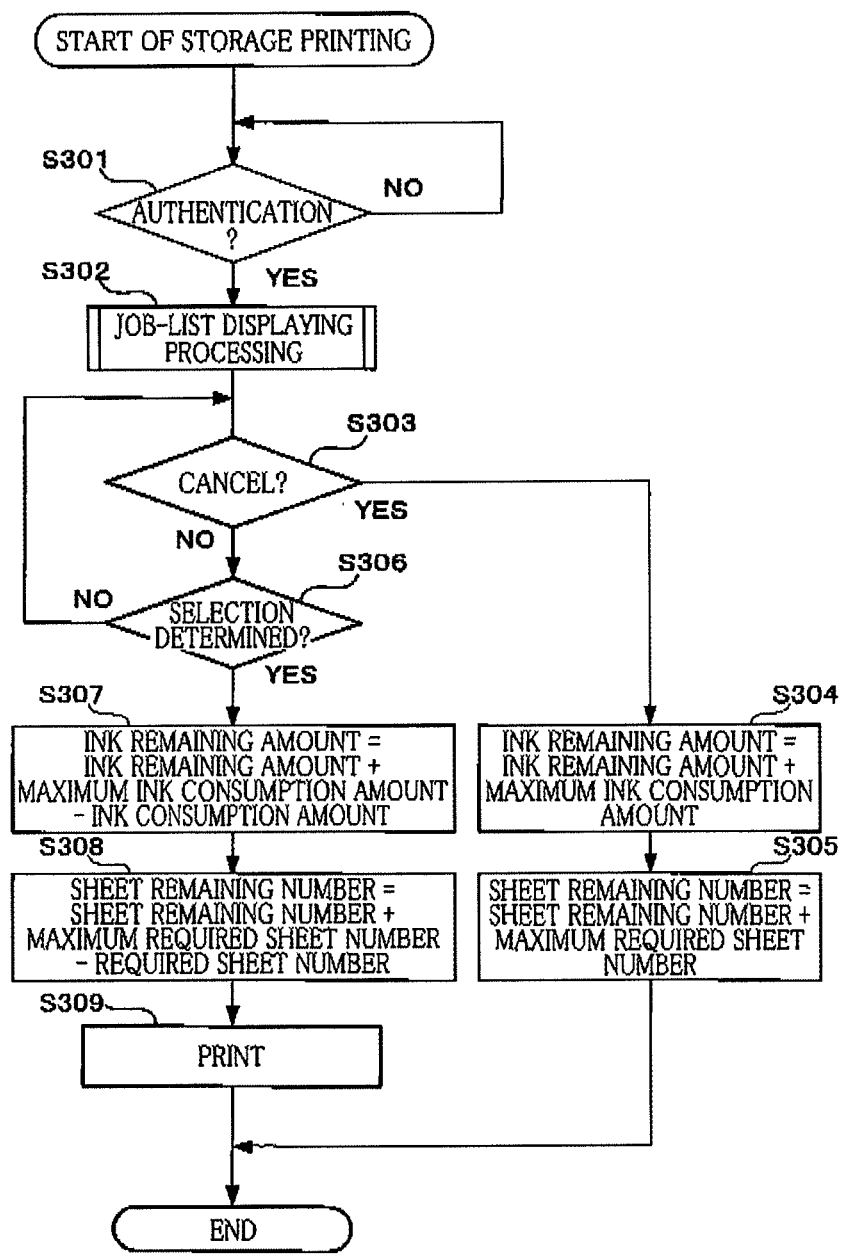
FIG. 7 is a flow chart showing a procedure of a storage printing executed by the MFP.

In the storage printing, after the user transmitted the print job to the MFP 200, the user directly operates the operation panel 40 such that printing based on the print job starts. As shown in FIG. 7, when the storage printing starts, the CPU 31 waits until the authentication data inputted by the user with the operation panel 40 fulfills a predetermined condition, that is, the authentication data inputted by the user coincides with the authentication data 34b stored in the EEPROM 34 (S301: NO). When the CPU 31 judges that the authentication data inputted by the user with the operation panel 40 fulfills the predetermined condition (S301: YES), the CPU 31 executes a job-list displaying processing (S302).

In the job-list displaying processing, a list of names of the print jobs related to the authenticated user is displayed on the operation panel 40. In the list of the print jobs, corresponding to each print job, information including an indication whether the printing is executable or not and at least one reason (information) why the printing is not executable is displayed (shown in FIG. 9). As shown in FIG. 8A, when the job-list displaying processing starts, the CPU 31 obtains each of the present remaining amount of ink from the ink remaining-amount data 34c stored in the EEPROM 34 and the present remaining number of sheets from the sheet remaining-number data 34d (S401). Then, the CPU 31 resets each of a maximum ink consumption amount and a maximum sheet consumption amount to 0 (S402). Each of the maximum ink consumption amount and the maximum sheet consumption amount is a variable.

The CPU 31 then obtains one print job related to the authenticated user from the print jobs included in the print-job data 34a (S403). The CPU 31 judges whether the printing for the obtained print job is executable or not (S404). Specifically, when the ink consumption amount in the obtained print job is equal to or smaller than the present remaining amount of ink, and when the number of pages in the obtained print job, i.e., the required number of sheets is equal to or smaller than the present remaining number of sheets, the CPU 31 judges that the printing is executable or judges the obtained print job to be printable (S404: YES). When at least one of a state in which the ink consumption amount in the obtained print job is greater than the present remaining amount of ink, and a state in which the number of pages in the obtained print job is greater than the present remaining number of sheets occurs, the CPU 31 judges that the printing is not executable or judges the print job to be unprintable (S404: NO). In other words, the CPU 31 compares the predicted consumption amount of each consumable (the ink, the sheets) with the remaining amount of each consumable, and when the predicted consumption amount of each consumable is equal to or smaller than the present remaining amount of each consumable, the CPU 31 judges that the printing for the print job is executable. When the predicted consumption amount of at least one consumable is greater than the present remaining amount of the at least one consumable, the CPU 31 does not judge that the printing for the print job is executable.

When the CPU 31 judges the print job to be printable (S404: YES), the CPU 31 judges whether the ink consumption amount in the obtained print job is greater than the maximum ink consumption amount (S405). Only when the CPU 31 judges that the ink consumption amount in the obtained print job is greater than the maximum ink consumption amount (S405: YES), the CPU 31 updates the maximum ink consumption amount to the ink consumption amount in the obtained print job (S406). Then, the CPU 31 judges whether the required number of sheets in the obtained print job is greater than the maximum required number of sheets (S407). Only when the CPU 31 judges that the required number of sheets in the obtained print job is greater than the maximum required number of sheets (S407: YES), the CPU 31 updates the maximum required number of sheets to the required number of sheets in the obtained print job (S408). Then, as shown in FIG. 9, the CPU 31 displays a print job name of the obtained print job (for example, 002 or 004) on the print job list displayed on the operation panel 40 and clears the information (displays no information) because the CPU 31 judges the print job to be printable (S409).

On the other hand, when the CPU 31 judges the obtained print job to be unprintable (S404: NO), the CPU 31 displays the print job name of the obtained print job (for example, 001 or 003) and the reason why the print job is unprintable as the information, and grays a line of the list corresponding to the print job out (S410). The reason why the print job is unprintable is, for example, short of ink in a case where the ink consumption amount in the print job is greater than the present remaining amount of ink, and short of sheets in a case where the required number of sheets in the print job is greater than the present remaining number of sheets. Regarding the processing executed in S409, the processing in which the print job name is displayed without the information (the information is cleared), i.e., the print job name is displayed without the reason why the print job is unprintable and is not grayed out, means the same as the information indicating the print job is printable is displayed.

When the CPU 31 judges that next print job exists (S411: YES), the CPU 31 goes to S403 and repeats the above-described processing regarding the next print job. Since the processing from S405 to S408 is repeatedly executed corresponding to the number of the print jobs, the maximum consumption amount of each consumable regarding one print job is drawn (extracted) from the ink consumption amount of each consumable regarding each of the print jobs that are printable. When the CPU 31 judges that there is no next print job (S411: NO), the CPU 31 updates the present remaining amount of ink to a value obtained by subtracting the maximum ink consumption amount from the present remaining amount of ink (S412), and updates the present remaining number of sheets to a value obtained by subtracting the maximum required number of sheets from the present remaining number of sheets (S413). A consumable remaining-amount managing processing (described later) is thus performed such that the remaining amount of each consumable is managed, so that, when the printing regarding one of the plurality of print jobs that are printable is performed, the inks and the sheets necessary for the printing regarding the one of the plurality of print jobs can be guaranteed. Therefore, during a period starts at a point in time when the names of the plurality of print jobs that are printable are listed on the operation panel 40 and ends at a point in time when the storage printing is completed, even if the normal printing, i.e., the printing regarding the print job that does not require the authentication in S301, is performed, the remaining amount of ink after the normal printing is performed is not smaller than the maximum ink consumption amount, and the remaining number of sheets after the normal printing is performed is not smaller than the maximum required number of sheets, so that the printing regarding one of the plurality of print jobs displayed on the print job list can be surely performed. The CPU 31 thus ends executing of the flow chart of FIG. 8A, and returns to the flow chart of FIG. 7.

Returning to the flow chart of FIG. 7, the CPU 31 judges whether the user instructs to cancel displaying of the list of the print jobs (or pushes down a cancel button) on the list of the print jobs (S303). When the CPU 31 judges that the user instructs the cancellation (S303: YES), the CPU 31 sets the present remaining amount of ink to a value obtained by adding the maximum ink consumption amount to the present remaining amount of ink (S304), and sets the present remaining number of sheets to a value obtained by adding the maximum required number of sheets to the present remaining number of sheets (S305), and ends executing of the flow chart of FIG. 7.

When the CPU 31 judges that the user does not instruct the cancellation (S303: NO), the CPU 31 judges whether the user determines to select one of the print jobs (or pushes down a print button) (S306). As mentioned later, the selection of one of the print jobs is determined according to another independent routine (shown in FIGS. 10 and 11). When the CPU 31 judges that the user does not determine to select one of the print jobs (S306: NO), the CPU 31 returns to S303, in which the CPU 31 judges whether the user instructs the cancellation. When the CPU 31 judges that the user determines to select one of the print jobs (S306: YES), the CPU 31 updates the present remaining amount of ink to a value obtained by subtracting the ink consumption amount in the selected print job from the value by adding the present remaining amount of ink and the maximum ink consumption amount (S307), and updates the present remaining number of sheets to a value obtained by subtracting the required number of sheets in the selected print job from the value by adding the present remaining number of sheets and the maximum required number of sheets (S308), and then, the printing regarding the selected print job is performed (S309). At this time, when a plurality of print jobs are selected, images are printed on the sheet in order based on the selected plurality of print jobs. The CPU 31 thus ends executing the flow chart of FIG. 7. In the present embodiment, the predicted consumption amount of each consumable (the inks and the sheets) and the remaining amount of each consumable are compared with each other, and the CPU 31 performs the printing only for the print jobs in which the predicted consumption amount of each consumable is equal to or smaller than the remaining amount of each consumable, so that the printing can be certainly completed without lack of the supplies in the middle of the printing.

Figure 8B:
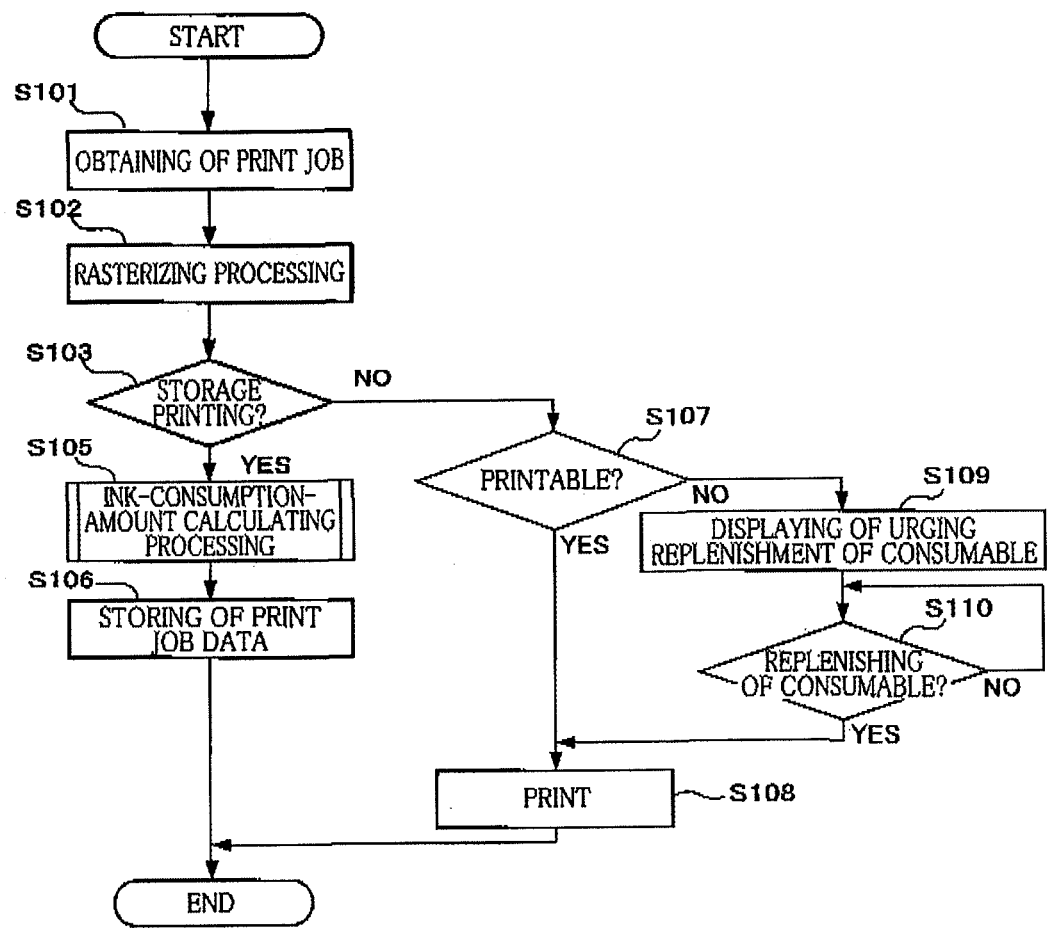
FIG. 8B is a flow chart showing a procedure regarding printing executed by the MFP when the print job is obtained during displaying of a job list shown in FIG. 9.

Hereinafter, the consumable-remaining-amount managing processing will be described. As described in FIG. 5, when the print job received by the MFP 200 is not the storage printing, i.e., is the normal printing (S103: NO), the CPU 31 basically performs the normal printing without confirming the remaining amount of each consumable (S104). On the other hand, there is a case where, while the print job list is displayed on the operation panel 40 as shown in FIG. 9, the MFP 200 receives the print job of the normal printing. In this case, if the normal printing is immediately performed, it is possible that the printing regarding the print job that is displayed on the print job list to be printable may not be performed. Therefore, in the above-mentioned consumable-remaining-amount managing processing, when the MFP 200 receives the print job of the normal printing during a time period starts at a point in time when the print job list is displayed in S303 in FIG. 7 and ends at a point of time when the print job is selected in S306, the CPU 31 executes a flow chart shown in FIG. 8B. As shown in FIG. 8B, when the print job that the MFP 200 receives is the normal printing (S103: NO), the CPU 31 judges whether the print job is printable (S107). The CPU 31 judges that the print job is printable when the amount of ink required for the printing regarding the print job is smaller than the remaining amount of ink calculated in S412 in FIG. 8A and when the number of sheets required for the printing regarding the print job is smaller than the number of sheets calculated in S413 in FIG. 8A. The remaining amount of ink calculated in S412 in FIG. 8A is the remaining amount of ink when the print job having the maximum consumption amount of ink among the plurality of print jobs that are displayed on the print job list is performed. The remaining number of sheets calculated in S413 in FIG. 8A is the required number of sheets when the print job having the maximum required number of sheets among the plurality of print jobs that are displayed on the print job list is performed. Accordingly, when the CPU 31 judges that the print job is printable in S107 in FIG. 8B, the CPU 31 can surely perform the printing regarding any one of the print jobs that are displayed on the print job list in FIG. 9. On the other hand, when the CPU 31 judges that the print job is unprintable (S107: NO), the CPU 31 displays to the user on the operation panel 40 such that the supplies should be replenished (S109). When the supplies are replenished by the user (S110: YES), the CPU 31 performs the printing regarding the print job (S108). Then, the CPU 31 sets the remaining amount of ink to a value by subtracting the consumption amount of ink in the printing for a processing in S108 from the present remaining amount of ink, and the CPU 31 sets the remaining number of sheets to a value by subtracting the required number of sheets in the printing for the processing in S108 from the present remaining number of sheets.

Figure 10:
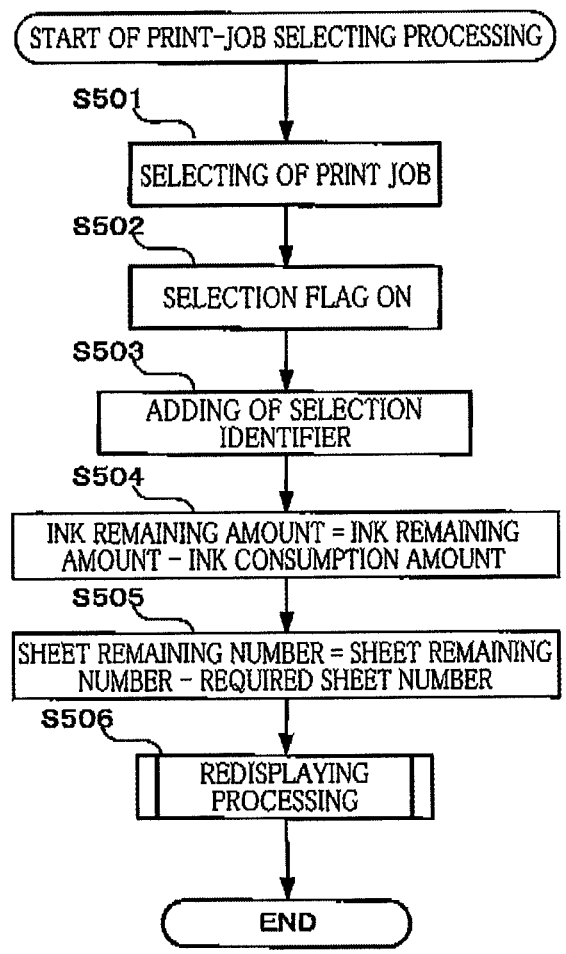
FIG. 10 is a flow chart showing a procedure of a print-job selection processing executed by the MFP.

Hereinafter, the print-job selection processing and the print-job deselection processing will be described with reference to FIGS. 10 through 13. As mentioned above, the print-job selection processing and the print-job deselection processing starts when the user performs an operation regarding the selection of the print job on the print job list during processing in S303 through S306 in the Dow chart of FIG. 7. As shown in FIGS. 10 and 11, when the user performs a selection to the print jobs that are displayed on the print job list, specifically, when the user touches a selection box of the print job that the user wants to select on the print job list, the CPU 31 selects the print job (S501), and sets a selection flag corresponding to the print job to ON (S502). In the present embodiment, the user cannot select the print jobs in gray-out that are unprintable. Then, the CPU 31 adds a check mark as an identifier to the selection box corresponding to the selected print job on the operation panel 40 (S503). The CPU 31 updates the present remaining amount of ink to a value obtained by subtracting the ink consumption amount in the selected print job from the present ink consumption amount (S504), and updates the present remaining number, of sheets to a value obtained by subtracting the required number of sheets in the selected print job from the present remaining number of sheets (S505). Then, the CPU 31 executes a redisplaying processing of the print job list (S506), and ends executing of the flow chart of FIG. 10. Since the above-described processing is repeatedly executed, the plurality of print jobs can be selected in turn. At this time, every time one of the plurality of print jobs is selected, the CPU 31 subtracts the ink consumption amount in the selected print job from the remaining amount of ink, and subtracts the required number of sheets in the selected print job from the remaining number of sheets.

Figure 12:
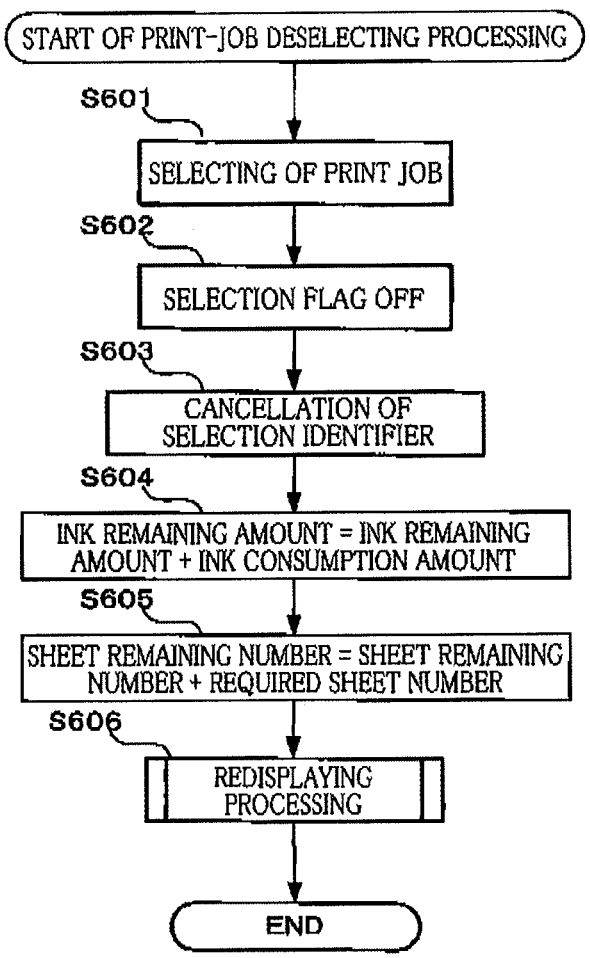
FIG. 12 is a flow chart showing a procedure of a print-job deselection processing executed by the MFP.

Further, as shown in FIG. 12, when the user performs deselection (cancellation of selection) of the print job that is selected by the user, specifically, when the user touches, on the print job list, the selection box of the print job whose selection the user is going to cancel, the CPU 31 selects the print job (S601), and sets the selection flag corresponding to the print job from ON to OFF (S602). Then, the CPU 31 deletes (cancels) the check mark on the operation panel 40 as the identifier added to the selection box corresponding to the print job (S603). The CPU 31 updates the present remaining amount of ink to a value obtained by adding the ink consumption amount in the cancelled print job to the present remaining amount of ink (S604), and updates the present remaining number of sheets to a value obtained by adding the required number of sheets in the cancelled print job to the present remaining number of sheets (S605). The CPU 31 then performs the redisplaying processing of the print job list as described later based on the updated remaining amount of ink and the updated remaining number of sheets (S606), and ends executing of the flow chart of FIG. 12.

Figure 13:
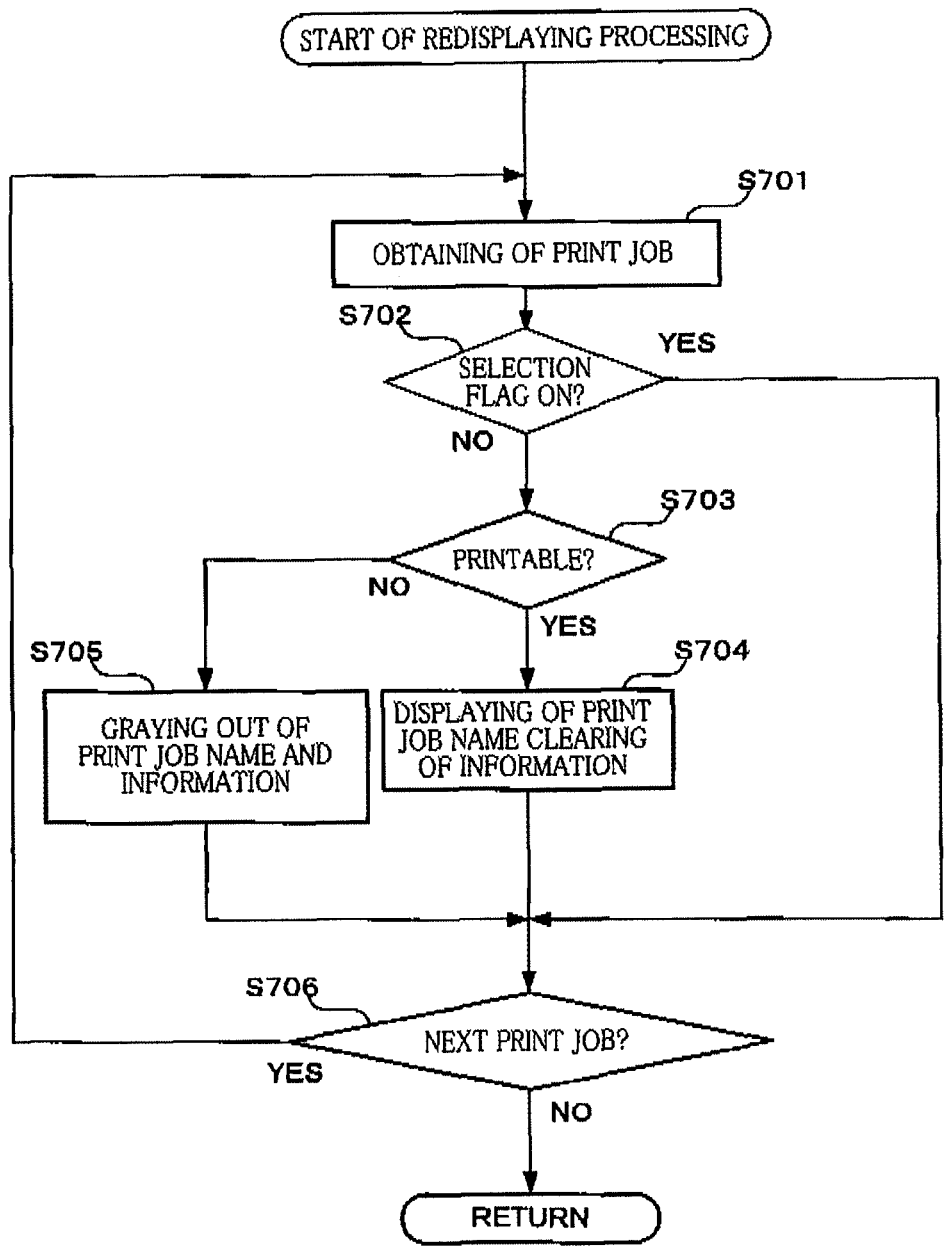
FIG. 13 is a flow chart showing a procedure of a redisplaying processing shown in FIGS. 10 and 12.

As shown in FIG. 13, when the redisplaying processing starts, the CPU 31 obtains one of the print jobs related to the authenticated user among the print jobs included in the print-job data 34a (S701). Only when the selection flag of the obtained print job is OFF (S702: NO), the CPU 31 judges whether the print job is printable (S703). When the CPU 31 judges that the print job is printable (S703: YES), the CPU 31 redisplays the name of the print job on the print job list and clears the information regarding the print job because the print job is printable (S704). On the other hand, when the CPU 31 judges that the print job is unprintable (S703: NO), the CPU 31 displays the name of the print job on the print job list and the reason why the print job is unprintable in the information, and then grays out the line corresponding to the print job on the print job list (S705).

Then, when the CPU 31 judges that next print job exists (S706: YES), the CPU 31 returns to S701 and repeats the above-described processing regarding the next print job. When the CPU 31 judges that the next print job does not exist (S706: NO), the CPU 31 ends executing of the flow chart of FIG. 13 and returns to the flow chart of FIG. 10 or FIG. 12.

Figure 14:
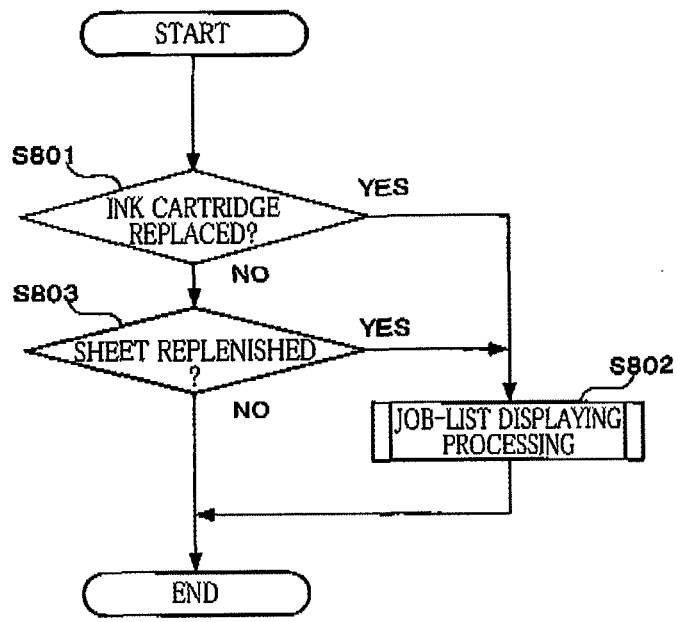
FIG. 14 is a flow chart showing a procedure of a displaying processing executed by the MFP.

When the print job list is displayed on the operation panel 40, and at least one consumable adding operation of replacing of the ink cartridges 11 and replenishing of the sheets to the sheet tray 14 is performed, the print job list is updated. Specifically, as shown in FIG. 14, when the consumable adding operation starts in a state in which the print job list is being displayed, the CPU 31 judges whether at least one of the ink cartridges 11 is replaced (S801). The CPU 31 can judge whether the at least one of the ink cartridges 11 is replaced based on the output signal from the ink sensor 11a. The CPU 31 may judge whether the at least one of the ink cartridges 11 is replaced based on ON or OFF of a mounting sensor separately disposed in each ink cartridge 11. When the CPU 31 judges that at least one of the ink cartridges 11 was replaced (S801: YES), the CPU 31 executes the job-list displaying processing (shown in FIG. 8A) based on the remaining amount of ink in the new ink cartridge 11 that the CPU 31 detects based on the output signal from the ink sensor 11a (S802), and ends executing of the flow chart of FIG. 14.

When the CPU 31 judges that the ink cartridge 11 is not replaced (S801: NO), the CPU 31 judges whether the sheets are supplied to the sheet tray 14 (S803). The CPU 31 can judge whether the sheets are supplied based on the output signal from the sheet sensor 14a. When the CPU 31 judges that the sheets were supplied (S803: YES), the CPU 31 executes the job-list displaying processing (shown in FIG. 8A) based on the remaining number of sheets after replenishing of sheets in the sheet tray 14 that the CPU 31 detects based on the output signal from the sheet sensor 14a (S802), and the CPU 31 ends executing of the flow chart of FIG. 14. When the CPU 31 judges that the sheets are not replenished (S803: NO), the CPU 31 ends executing of the flow chart of FIG. 14.

Figure 15:
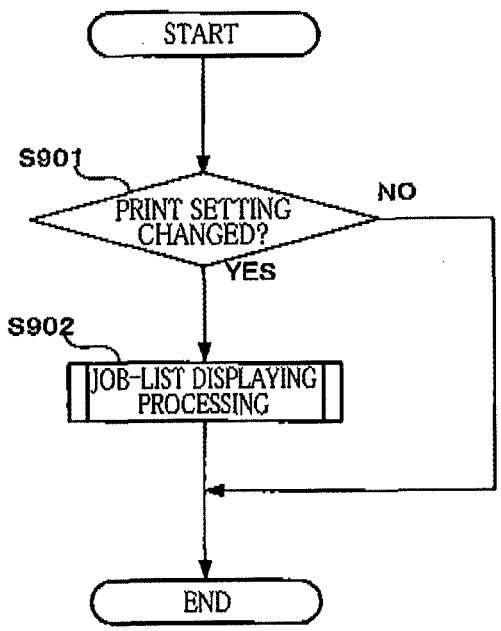
FIG. 15 is a flow chart showing another procedure of the displaying processing executed by the MFP.

Further, in a state in which the print job list is displayed on the operation panel 40, when setting of the print job is changed such that the ink consumption amount or the required number of sheets changes, the print job list is updated. Setting of the print job can be changed in such a way that, when the print job list is being displayed, the user pushes down a setting changing button in a state in which the intended print job is selected. Change in settings includes changing in the sheet kind and the required number of sheets in the print job. As shown in FIG. 15, when the user actually changes the settings (S901: YES), the CPU 31 rewrites the ink consumption amount and/or the required number of sheets in the print-job data, and executes the job-list displaying processing (shown in FIG. 8A) based on the rewritten print-job data (S902), and then, the CPU 31 ends executing of the flow chart of FIG. 15. When the user does not change the settings (S901: NO), the CPU 31 ends executing of the flow chart of FIG. 15.

As described above, in the MFP 200 in the present embodiment, in a secure circumstance in which the input of the authentication information is needed, it is prevented that the printing is performed in a state in which the user does not notice the lack of ink and/or the sheets during printing. Therefore, it is restrained that the user moves away from the MFP 200 during printing, so that the leakage of information can be prevented.

Further, since, in the job-list displaying processing, the CPU 31 updates the present remaining amount of ink to the value obtained by subtracting the maximum ink consumption amount from the present remaining amount of ink, and updates the present remaining number of sheets to the value obtained by subtracting the maximum required number of sheets from the present remaining number of sheets, even if the normal printing is performed before the storage printing is performed, the actual remaining amount of ink does not become smaller than the maximum ink consumption amount, and the actual remaining number of sheets does not become smaller than the maximum required number of sheets. Accordingly, regarding any one print job that is displayed to be printable on the print job list, even if the normal printing is performed after the print job list was displayed, the printing can be surely performed without lack of the supplies in the middle of the printing.

Furthermore, every time the plurality of print jobs are selected in turn, the remaining amount of each consumable is updated, and the redisplaying processing is performed based on the updated remaining amount of each consumable, so that, even in a case of printing in turn based on the plurality of print jobs, without lack of the supplies, images according to the plurality of print jobs can be printed altogether.

Moreover, in the state in which the print job list is displayed, when the at least one of consumable adding operations such as replacing of the ink cartridges 11 and supplying of the sheets to the sheet tray 14 is performed, the print job list is updated based on the remaining amount of each consumable after changing (including increasing and decreasing) in the remaining amount of each consumable, so that whether the print job is printable or not can be properly displayed depending on changing in the remaining amount of each consumable.

Further, in the state in which the print job list is displayed on the operation panel 40, when the settings of the print job are changed such that the ink consumption amount or the required number of sheets are changed, the print job list is updated based on the rewritten print-job data, so that whether the print job is printable or not can be properly displayed depending on rewritten contents of the print job.

Second Embodiment

Figure 16:
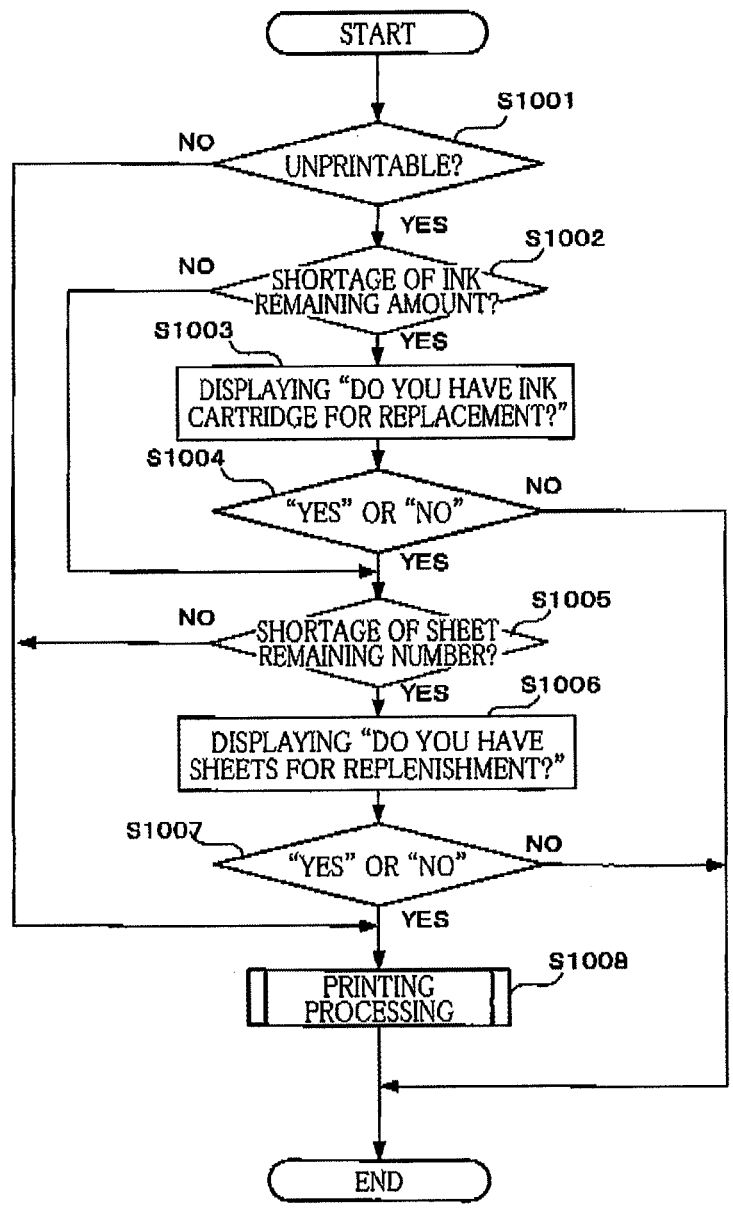
FIG. 16 is a flow chart showing a procedure regarding the printing executed by the MFP as a second embodiment to which the present invention is applied.

Hereinafter, a second embodiment in the present invention will be described with reference to FIGS. 16 through 18. In the second embodiment, the identical elements as those in the first embodiment will be denoted by the reference numerals used in the first embodiment, and description thereof is omitted. In the first embodiment, in the selection processing of the print jobs, the user cannot select the print job that is unprintable. However, in the present embodiment, the user can also select the print job that is unprintable. That is, in the print job list in FIG. 9, the CPU 31 displays the print job name of the unprintable print job and the information about the remaining amount of each consumable, and does not gray the line of the list corresponding to the unprintable print job out. The user can recognize the unprintable print job by seeing the information. In other words, the information about the remaining amount of each consumable displayed on the print job list informs that the print job is not printable. Therefore, the printing may be performed in a state in which there is possibility of being short of ink and the sheets. As shown in FIG. 16, when the printing is performed, the CPU 31 judges whether the selected print job is not printable (S1001). When the CPU 31 judges that the selected print job is printable (S1001: NO), the CPU 31 executes the printing processing (S1008).

Figure 17A:
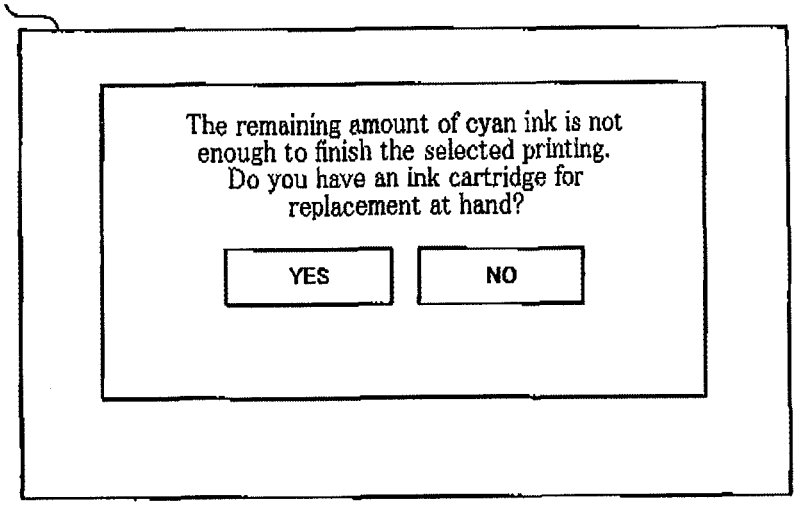
FIGS. 17A and 17B are views each showing a content displayed on the operation panel in the procedure shown in FIG. 16.

When the CPU 31 judges that the selected print job is not printable (S1001: YES), the CPU 31 judges whether the remaining amount of ink for the selected print job is short (or whether the ink consumption amount is greater than the remaining amount of ink) (S1002). When the CPU 31 judges that the remaining amount of ink is short (S1002: YES), as shown in FIG. 17A, the CPU 31 displays on the operation panel 40 a content (a screen) inquiring of the user whether the ink cartridge 11 for replacement is prepared at hand (S1003). When the CPU 31 confirms that the user answers "NO" to the inquiry (S1004; NO), the CPU 31 stops the printing and ends executing of the flow chart of FIG. 16. The content inquiring of the user displayed on the operation panel is an example of a warning message.

Figure 17B:
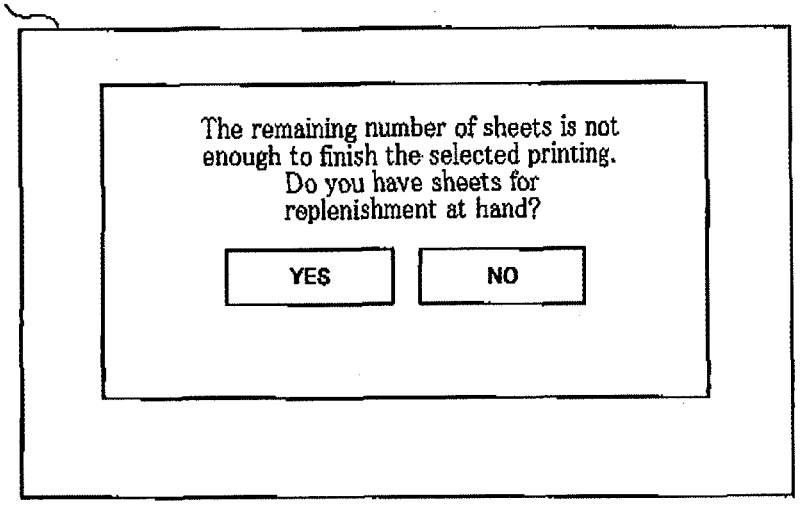

When the CPU 31 confirms that the user answers "YES" to the inquiry (S1004: YES), the CPU 31 judges whether the remaining number of sheets for the selected print job is short (or whether the required number of sheets is greater than the remaining number of sheets) (S1005). When the CPU 31 judges that the remaining number of sheets is short (S1005: YES), as shown in FIG. 17B, the CPU 31 displays on the operation panel 40 a content (a screen) inquiring of the user whether the sheets for replenishment are ready at hand (S1006). When the CPU 31 confirms that the user answers "NO" to the inquiry (S1007: NO), the CPU 31 stops the printing and ends executing of the flow chart of FIG. 16. When confirming that the user answers "YES" to the inquiry (S1007: YES), the CPU 31 executes the printing processing (S1008) The content inquiring of the user displayed on the operation panel is an example of a warning message.

Figure 18:
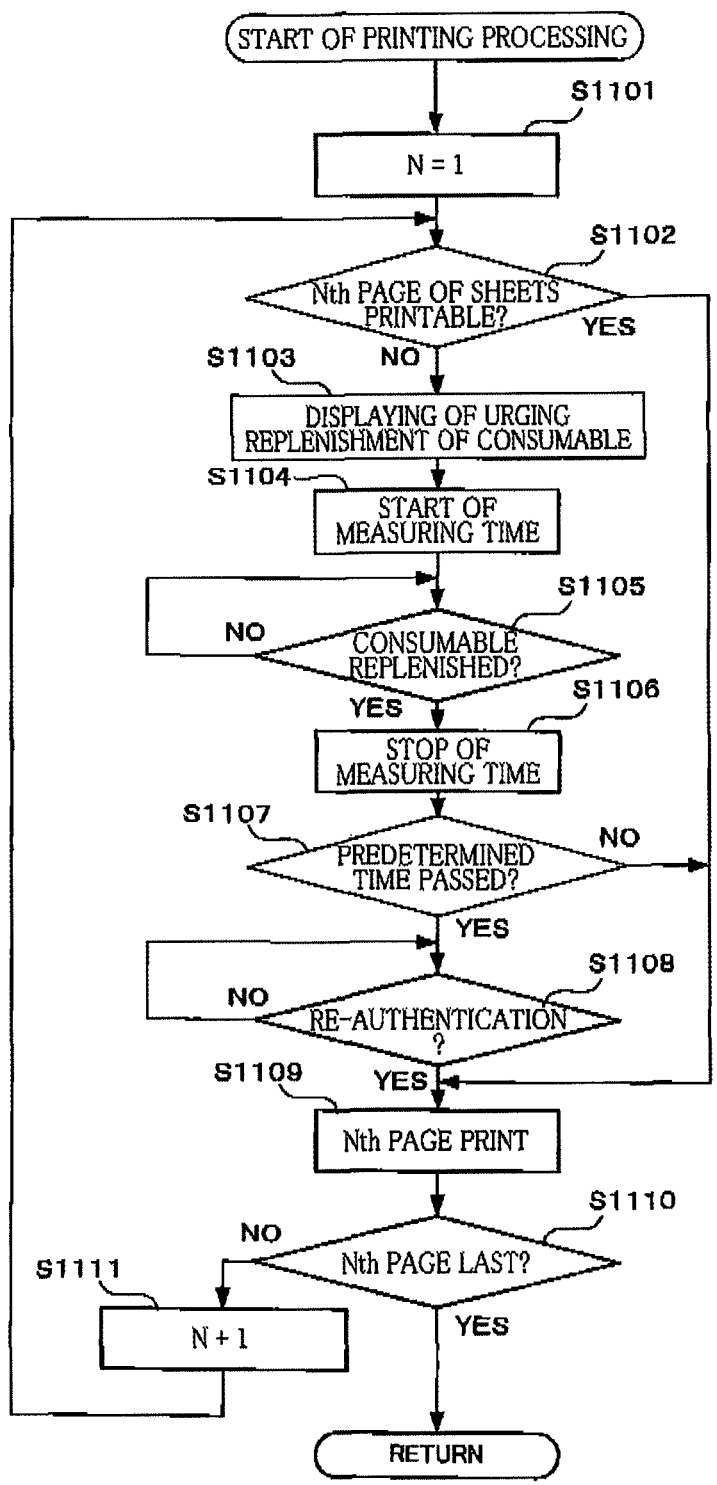
FIG. 18 is a flow chart showing a procedure of a printing processing shown in FIG. 16.

When the printing processing starts, as shown in FIG. 18, the CPU 31 resets a variable N to 1 (S1101). Then, when the CPU 31 judges that the print job is printable on the Nth page of the sheets according to the selected print job (S1102:YES), the CPU 31 gets the Nth page of the sheets printed (S1109). When the CPU 31 judges that the print job is unprintable on the Nth page of the sheets (S1102: NO), the CPU 31 displays on the operation panel 40 a massage for the replacement of the ink cartridge 11 or the replenishment of the supplies such as the sheets (S1103), and starts to measure a time (S1104). The CPU 31 judges whether the replenishment of the supplies is finished, based on the output signals from the ink sensor 11a and the sheet sensor 14a (S1105).

The CPU 31 waits until the replenishment of the supplies is finished (S1105: NO). When the CPU 31 judges that the replenishment of the supplies is finished (S1105: YES), the CPU 31 stops measuring the time (S1106), and judges whether the measured time passes a predetermined time period (S1107). When the CPU 31 judges that the measured time passes the predetermined time period (S1107: YES), the CPU 31 waits and displays a message for re-authentication until the user completes the re-authentication (the authentication data inputted through the operation panel 40 fulfills the predetermined condition) (S1108: NO). When the CPU 31 judges that the user has completed the re-authentication (S1108: YES), the CPU 31 performs the printing on the Nth page of the sheets (S1109). When the Nth page is not the last one (S1110: NO), the CPU 31 counts up the N (S1111) and goes to S1102, in which the CPU 31 judges whether the next Nth page of the sheets are printable. When the Nth page is the last one (S1110: YES), the CPU 31 ends executing of the flow chart of FIG. 18.

As described above, in the MFP 200 in the present embodiment, in a secure circumstance that requires the input of the authentication information, it is prevented that the printing continues in a state in which the user does not notice a shortage of the inks or the sheets. Accordingly, it is restrained that the user carelessly moves away from the MFP 200 during the printing, so that the leakage of information can be restrained.

Further, since the user previously knows of the shortage of the supplies necessary for the printing in S1003 and S1006, even if the supplies are short, the printing is performed in a state in which the supplies are ready at hand, so that the leakage of information can be restrained.

Furthermore, timing at which the re-authentication is requested is adjusted depending on a length of an interruption time during the printing (a length of a predetermined time period), so that the user's convenience and the security of the printing can be consistent with each other.

The present invention is not limited to the illustrated embodiments. It is to be understood that the present invention may be embodied with various changes and modifications that may occur to a person skilled in the art, without departing from the spirit and scope of the invention defined in the appended claims. For example, though, in the illustrated embodiments, the inks and the sheets as the supplies are managed, the other supplies whose remaining amounts decrease as the printing is performed may be managed. For example, a free space of a waste tank that collects discharged ink discharged through maintenance of the head 10 (such as a purging operation) may be managed as a consumable.

Further, though the illustrated embodiments are constructed such that the plurality of print jobs are selected and the printing can be performed altogether regarding the selected plurality of print jobs, only one print job may be selected.

Furthermore, in the illustrated embodiments, in the state in which the print job list is being displayed, when at least one of the consumable adding operations such as the replacement of the ink cartridge 11 and the replenishment of the sheets to the sheet tray 14 is performed, or when the change in the settings of the print job such that the ink consumption amount or the required number of sheets changes is performed, the print job list is updated. Even if any one of the consumable adding operations or the change in the settings of the print job is performed, the print job list may not be updated. In this case, it is preferable that the print job list is manually updated.

Moreover, though the illustrated embodiments are constructed such that the reason why the print job is unprintable is displayed on the information of the print job list, it is not necessary to display the reason why the print job is unprintable, and only whether the print job is printable or not may be displayed on the information of the print job list. The information about the print job indicating the print job is unprintable may not be displayed on the print job list on the operation panel 40. In other words, regarding the unprintable print job, information indicating the print job is printable may not be displayed on the operation panel 40.

In the illustrated embodiments, the ink-consumption-amount calculating processing (S105) is performed when the MFP 200 receives the print job transmitted from the PC 100. However, the ink-consumption-amount calculating processing may be performed in the job-list displaying processing (S302). Further, in the illustrated embodiments, regarding the obtained print job, the comparison between the ink consumption amount and the remaining amount of ink, and the comparison between the required number of sheets and the remaining number of sheets are performed in S404, in which the CPU 31 judges whether the printing for the print job is executable. However, it may be constructed such that the above-mentioned two comparisons regarding all of the stored print jobs are performed prior to S404, and the results of the two comparisons regarding all of the stored print jobs are stored, and in S404, the stored results are used. Furthermore, in the illustrated embodiments, the user inputs the authentication data by using the operation panel 40, but, instead of this, the user may input the authentication data through wireless communication with an IC card.

In the illustrated embodiments, the CPU 31 detects the remaining amount of ink by using the output signal from the ink sensor 11a. Instead of this, the ink sensor 11a may not be used for detecting the remaining amount of ink. In this case, the CPU 31 detects the remaining amount of ink by sequentially subtracting an amount of ink ejected from the head 10 from an initial amount of ink. Similarly, though, in the illustrated embodiments, the CPU 31 detects the remaining number of sheets by using the output signal from the sheet sensor 14a, the sheet sensor 14a may not be used for detecting the remaining number of sheets by sequentially subtracting a number of printed sheets from an initial number of sheets. Further, instead of the MFP 200, the present invention is applicable to a copier, a printer, a scanner, and a facsimile.

Furthermore, the processings disclosed in the illustrated embodiments may be executed by a CPU, a plurality of CPUs, hardware such as an ASIC, or a combination of the above-mentioned devices. The processings disclosed in the illustrated embodiments can be realized in various embodiments such as a recording medium on which programs for executing the processings are recorded, a method for executing the processings, or the like.

What is claimed is:

1. An image recording apparatus comprising:
   at least one container, each being configured to contain consumables;

a recorder configured to record an image with the consumables on a recording medium;

a communication unit configured to communicate with an external device;

an input device configured to receive information corresponding to user operation;

a memory;

a display configured to display information;

a controller coupled with and configured to control the recorder, communication unit, input device, and the display, the controller being configured to perform:
  receiving an authenticated recording command and a non-authenticated recording command, via the communication unit, transmitted from the external device, the authentication recording command requiring specific information for authentication;
  storing, in the memory, the authenticated recording command received by the communication unit;
  detecting a remaining amount of the consumables in the container;
  calculating a consumption amount of the consumables to be consumed for recording the image in accordance with the stored authenticated recording command;
  receiving authentication information, from the input device, the authentication information corresponding to the stored authenticated recording command;
  determining whether the received authentication information includes the specific information required by the stored authenticated recording command;
  when it is determined that the received authentication information includes the specific information required by the stored authenticated recording command, authenticating the stored authenticated recording command and comparing the detected remaining amount of the consumables with the calculated consumption amount of the consumables to be consumed for recording the image in accordance with the authenticated recording command;
  determining the authenticated recording command as a first authenticated recording command when the calculated consumption amount of the consumables is equal to or less than the detected remaining amount of the consumables;
  displaying, on the display, information of the first authenticated recording command with a first indication indicating the first authenticated recording command is executable by the recorder;
  determining the authenticated recording command as a second authenticated recording command when the calculated consumption amount of the consumables is greater than the detected remaining amount of the consumables; and
  displaying, on the display, information of the second authenticated recording command without the first indication,
  determining a new remaining amount of the consumables by subtracting the consumption amount of the consumables for the first authenticated recording amount from the remaining amount of the consumables,
  receiving the non-authenticated recording command while the first authenticated recording command is being displayed on the display with the first indication;
  calculating the consumption of the consumables for recording the image in accordance with the received non-authenticated recording command;
  determining whether the calculated consumption amount of the consumables for the non-authenticated recording command is equal to or less than the new remaining amount of the consumables;
  controlling the recorder to record the image in accordance with the non-authenticated recording command, when it is determined that the calculated consumption of the consumables for the received non-authenticated recording command is equal to or less than the new remaining amount of the consumables; and
  displaying, on the display device, a message for supplying the consumables and waiting to cause the recorder to record the image in accordance with the non-authenticated recording command until the consumables are supplied, when it is determined that the calculated consumption of the consumables for the received non-authenticated recording command is greater than the new remaining amount of the consumables.

2. The image recording apparatus according to claim 1,
wherein a plurality of authenticated recording commands are received and at least two of which are determined as a plurality of first authenticated recording commands is determined, and wherein the controller is further configured to perform:
determining a particular calculated consumption amount of the consumables, which is the greatest calculated consumption amount of the consumables among each calculated consumption amount of the consumables to be consumed for recording the image in accordance with each of the plurality of first authenticated recording command; and determining the new remaining amount of the consumables by subtracting the particular calculated consumption amount of the consumables from the detected remaining amount of the consumables.

3. The image recording apparatus according to claim 2,
wherein the plurality of authenticated recording commands are received and at least two of which are determined as a plurality of first authenticated recording commands is determined, and wherein the controller is further configured to perform:
receiving selection information from the input device, the selection information representing a selected first authenticated recording command that is one of the plurality of first authenticated recording commands being displayed on the display;

determining a new remaining amount of the consumables by subtracting a calculated consumption amount of the consumables to be consumed for recording the image in accordance with the selected first authenticated recording command from and adding the particular calculated consumption amount of the consumables to the detected remaining amount of the consumables;

displaying, on the display, information of the other of the plurality of first authenticated recording command with the first indication indicating the first authenticated recording command is executable by the recorder when the calculated consumption amount of the consumables for the other of the plurality of first authenticated recording commands is less than or equal to the new remaining amount of the consumables, and displaying, on the display, information of the other of the plurality of first authenticated recording command without the first indication when the calculated consumption amount of the consumables for the other of the plurality of first authenticated recording commands is greater than the new remaining amount of the consumables.

4. The image recording apparatus according to claim 1, wherein the controller is further configured to perform:
   determining whether the detected remaining amount of the consumables has been changed to a current remaining amount from a previous remaining amount;
   when it is determined that the detected remaining amount of the consumables has been changed to the current remaining amount from the previous remaining amount, determining the authenticated recording command as the first authenticated recording command when the calculated consumption amount of the consumables is equal to or less than the current remaining amount of the consumables;
   displaying, on the display, information of the first authenticated recording command with the first indication indicating the first authenticated recording command is executable by the recorder;
   determining the authenticated recording command as the second authenticated recording command when the calculated consumption amount of the consumables is greater than the current remaining amount of the consumables; and
   displaying, on the display, information of the second authenticated recording command without the first indication.

5. The image recording apparatus according to claim 1, wherein the controller is further configured to perform:
   receiving an instruction to change setting of the authenticated recording command;
   updating the authenticated recording command in accordance with the received instruction;
   calculating an updated consumption amount of the consumables to be consumed for recording the image in accordance with the updated authenticated recording command;
   determining the updated authenticated recording command as the first authenticated recording command when the updated consumption amount of the consumables is equal to or less than the detected remaining amount of the consumables;
   displaying, on the display, information of the first authenticated recording command with the first indication indicating the first authenticated recording command is executable by the recorder;
   determining the updated authenticated recording command as the second authenticated recording command when the updated consumption amount of the consumables is greater than the detected remaining amount of the consumables; and
   displaying, on the display, information of the second authenticated recording command without the first indication.

6. The image recording apparatus according to claim 1, wherein the controller is further configured to perform:
   receiving selection information from the input device, the selection information representing a selected recording command of the authenticated recording command that is one of the plurality of first authenticated recording commands being displayed on the display; and
   controlling the recorder to record the image in accordance with the selected recording command.

7. The image recording apparatus according to claim 6, wherein the controller is further configured to perform:
   determining whether the calculated consumption amount of the consumables for the selected recording command is greater than the detected remaining amount of the consumables;
   when it is determined that the calculated consumption amount of the consumables for the selected recording command is greater than the detected remaining amount of the consumables, controlling the display to display a warning message;
   receiving a user's approval from the input device after displaying the warning message; and
   in response to receiving the user's approval, controlling the recorder to record the image in accordance with the selected recording command.

8. An image recording apparatus comprising:
   at least one container, each being configured to contain consumables;
   a recorder configured to record an image with the consumables on a recording medium;
   a communication unit configured to communicate with an external device;
   an input device configured to output information corresponding to user operation;
   a memory;
   a display configured to display information;
   a controller coupled with and configured to control the recorder, communication unit, input device, and the display,
   the controller being configured to perform:
      receiving a recording command, via the communication unit, transmitted from the external device;
      storing, in the memory, the recording command received by the communication unit, when the received recording command requires specific information to authenticate;
      detecting a remaining amount of the consumables in the container;
      calculating a consumption amount of the consumables to be consumed for recording the image in accordance with the stored recording command;
      receiving authentication information, from the input device, the authentication information corresponding to the stored recording command;
      determining whether the received authentication information includes the specific information required by the stored recording command to authenticate;
      when it is determined that the received authentication information includes the specific information required by the stored recording command to authenticate, authenticating the stored recording command and comparing the detected remaining amount of the consumables with the calculated consumption amount of the consumables to be consumed for recording the image in accordance with the authenticated recording command;
      determining the authenticated recording command as a first authenticated recording command when the calculated consumption amount of the consumables is equal to or less than the detected remaining amount of the consumables;
      displaying, on the display, information of the first authenticated recording command with a first indication indicating the first authenticated recording command is executable by the recorder;

determining the authenticated recording command as a second authenticated recording command when the calculated consumption amount of the consumables is greater than the detected remaining amount of the consumables; and displaying, on the display, information of the second authenticated recording command without the first indication, receiving selection information from the input device, the selection information representing a particular recording command of the authenticated recording command; and controlling the recorder to record the image in accordance with the particular recording command;

determining whether the calculated consumption amount of the consumables for the particular recording command is greater than the detected remaining amount of the consumables;

when it is determined that the calculated consumption amount of the consumables for the particular recording command is greater than the detected remaining amount of the consumables, controlling the display to display a warning message;

receiving a user's approval from the input device after displaying the warning message; and in response to receiving the user's approval, controlling the recorder to record the image in accordance with the particular recording command detecting a particular remaining amount of consumables while the recorder records the image in accordance with the particular recording command;

determining, while the recorder records the image in accordance with the particular recording command, whether the detected particular remaining amount of the consumables is less than a necessary amount of the consumables to complete the particular recording command;

when it is determined that the detected particular remaining amount of the consumables is less than the necessary amount of the consumables to complete the particular recording consumed, suspending the recorder to record the image in accordance with the particular recording command at a first timing;

detecting another remaining amount of consumables while suspending;

determining, while suspending, whether said another particular remaining amount of the consumables is equal to or greater than the necessary amount of the consumables to complete the particular recording command;

when it is determined that the detected particular remaining amount of the consumables is equal to or greater than the necessary amount of the consumables to complete the particular recording consumed, determining a second timing;

when a threshold period since the first timing has elapsed at the second timing, controlling the recorder to resume recording the image in accordance with the particular recording command; and when the threshold period since the first timing has not elapsed at the second timing, controlling the display to display a message for re-authentication.

9. The image recording apparatus according to claim 8, wherein the controller is further configured to perform:

receiving the authentication information, from the input device, corresponding to the particular recording command; and in response to receiving the authentication information, controlling the recorder to resume recording the image in accordance with the particular recording command, controlling the recorder to record the image in accordance with the selected recording command, when the received recording command does not require the specific information to authenticate, controlling the recorder to record, without authentication, the image in accordance with the received recording command, determining at least one maximum consumption amount among at least one of the calculated consumption amount of consumables to be consumed for recording the image in accordance with the authenticated recording command the information of which is displayed with the first indication, managing the remaining amount of the consumables such that, until the recording in accordance with the selected recording command is completed, the remaining amount of the consumable does not become less than the determined maximum consumption amount.

\* \* \* \* \*